United States Patent

Kanao

[11] Patent Number: 5,879,428
[45] Date of Patent: Mar. 9, 1999

[54] APPARATUS FOR MANUFACTURING OPTICAL FIBER PREFORM

[75] Inventor: Akihiro Kanao, Kameyama, Japan

[73] Assignee: The Furukawa Electric Co., Ltd., Tokyo, Japan

[21] Appl. No.: 742,865

[22] Filed: Nov. 1, 1996

[30] Foreign Application Priority Data

Nov. 7, 1995 [JP] Japan .................................. 7-288218

[51] Int. Cl.$^6$ ................................................ C03B 37/018
[52] U.S. Cl. .......................................................... 65/532
[58] Field of Search ........................... 65/414, 532, 530, 65/531, 413, 415, 416, 421, 503

[56] References Cited

U.S. PATENT DOCUMENTS

| 4,435,199 | 3/1984 | Potkay | 65/414 |
| 4,713,107 | 12/1987 | Yoshida | 65/414 |
| 5,211,732 | 5/1993 | Abbott | 65/3.12 |

FOREIGN PATENT DOCUMENTS

| 56-37179 | 8/1981 | Japan | 65/532 |
| 61-20492 | 5/1986 | Japan | 65/414 |
| 63-182227 | 7/1988 | Japan | 65/530 |
| 63-242940 | 10/1988 | Japan | 65/414 |
| 2-164735 | 6/1990 | Japan . | |
| 2-283632 | 11/1990 | Japan | 65/413 |
| 5-70168 | 3/1993 | Japan | 65/532 |
| 6316422 | 11/1994 | Japan | 65/414 |
| 2134896 | 8/1984 | United Kingdom | 65/414 |

OTHER PUBLICATIONS

Webster's Ninth New Collegiate Dictionary, 1990 p. 916.

*Primary Examiner*—John Hoffmann
*Attorney, Agent, or Firm*—Frishauf, Holtz, Goodman, Langer & Chick

[57] ABSTRACT

An apparatus for manufacturing an optical fiber preform, comprising a reaction vessel housing a core, combustion burners each arranged such that a flame spurting port thereof is positioned within the reaction vessel so as to generate fine glass particles by a flame hydrolysis reaction, and a discharge unit including a discharge port arranged on a side of the reaction; vessel for discharging the excess fine glass particles which were not deposited on the core and the waste gas out of the reaction vessel, wherein an angle formed between an imaginary plane including the flame spurting port of one of the combustion burners and another imaginary plane including the discharge port of the discharge unit falls within a range of between 0° and 40°.

7 Claims, 1 Drawing Sheet

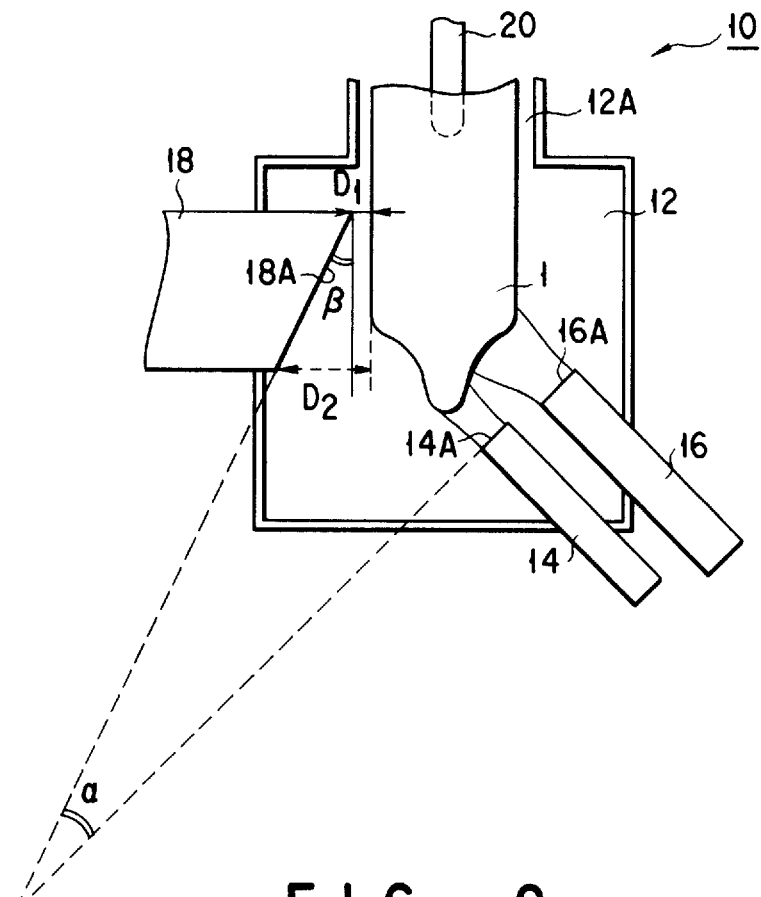
F I G. 2

APPARATUS FOR MANUFACTURING OPTICAL FIBER PREFORM

BACKGROUND OF THE INVENTION

1. Field of the Invention

The present invention relates to an apparatus for manufacturing a porous optical fiber preform.

2. Description of the Related Art

It was customary in the past to manufacture an optical fiber preform by depositing fine glass particles to cover the surface of a core by means of, for example, CVD (Chemical Vapor Deposition), as shown in FIG. 1. Specifically, fine glass particles generated by a combusting burner 32 are blown against the outer circumferential surface of a core 31 arranged within a reaction vessel 30 while rotating the core 31. As a result, the blown fine glass particles are deposited to cover the surface of the core 31 so as to form a porous optical fiber preform 33. Then, the porous optical fiber preform 33 is vitrified so as to obtain a desired transparent optical fiber preform.

The fine glass particles which were not deposited on the core 31 are transferred together with the waste gas after the reaction into a waste gas processing apparatus (not shown) through a discharge pipe 34

In the conventional apparatus described above, the combustion burner 32 is generally arranged to allow the flame-spurting port thereof to face obliquely upward such that the axial direction of the burner 32 makes a predetermined angle with a vertical plane. What should be noted is that the reaction heat within the vessel 30 causes an upward air stream within the vessel 30, with the result that the flame spurted from the burner 32 is turned upward by the upward air stream. The fine glass particles within the flame are moved upward together with the gaseous stream consisting of the air and flame so as to collide against the core 31 and, thus, to be deposited on the tip and outer circumferential surface of the core 31. On the other hand, the excess fine glass particles which were not deposited on the core 31 are further transferred together with the gaseous stream noted above so as to be discharged together with the waste gas to the outside through the discharge pipe 34.

In the conventional apparatus, it is important to take sufficient measures for preventing the waste gas within the reaction vessel 30 and the excess fine glass particles which were not deposited on the core 31 from negatively impacting the fine glass particles deposited on the core 31. It is also important to take sufficient measures for preventing the excess fine glass particles which were not deposited on the core 31 from being deposited on, for example, the inner surface of the reaction vessel 30. To meet these requirements, it is necessary to discharge efficiently the waste gas and the excess fine glass particles which were not deposited on the core 31 to the outside through the discharge pipe 34. Therefore, it is desirable for the discharge pipe 34 to be positioned on the side opposite to the side on which the fine glass particles within the flame are deposited on the core 31 such that an intake port 35 of the pipe 34 is positioned as close to the core 31 as possible.

However, if the intake port 35 is unduly close to the core 31, the gaseous stream within the reaction vessel 30 is disturbed, resulting in failure to achieve an efficient discharge of the waste gas and the excess fine glass particles. As a result, the excess fine glass particles partly collide against the lower end portion of the intake port 35, giving rise to deposition of fine glass particles D on the lower end portion of the intake port 35.

If the deposition of the fine glass particles D on the lower end portion of the intake port 35 of the discharge pipe 34 grows, the gaseous stream within the reaction vessel 30 is disturbed so as to change the flowing direction of the fine glass particles within the flame. It follows that the fine glass particles fail to collide against the core 31 at a desired position, resulting in failure to obtain the porous optical fiber preform 33 of a desired shape.

It should also be noted that, if the deposition of the fine glass particles D shown in FIG. 1 grows, the grown deposition is brought into contact with the fine glass particles deposited on the core 31 so as to damage to the porous optical fiber preform 33.

SUMMARY OF THE INVENTION

An object of the present invention is to provide an apparatus for manufacturing an optical fiber preform which permits efficient discharge of the waste gas and the excess fine glass particles to the outside, which prevents the gaseous stream within the reaction vessel from being disturbed, and which also prevents the porous optical fiber preform deposited on the core from being damaged.

According to one embodiment of the present invention, there is provided an apparatus for manufacturing an optical fiber preform, comprising:

a reaction vessel housing a core;

combustion burners each arranged such that a flame spurting port thereof is positioned within said reaction vessel so as to generate fine glass particles by a flame hydrolysis reaction; and a discharge unit for discharging excess fine glass particles which were not deposited on said core and waste gas out of said reaction vessel, wherein an angle made between an imaginary plane including the flame spurting port of said combusting burner and another imaginary plane including a discharge port of said discharge unit falls within a range of between 0 and 40°.

According to another embodiment of the present invention, there is provided an apparatus for manufacturing an optical fiber preform, comprising:

a reaction vessel housing a core;

a combustion burner arranged such that a flame spurting port thereof is positioned within said reaction vessel so as to generate fine glass particles by a flame hydrolysis reaction; and a discharge unit including a discharge port arranged on a side of said reaction vessel for discharging excess fine glass particles which were not deposited on said core and waste gas out of said reaction vessel, wherein a ratio $D_1/D_2$ falls within a range of between 0.3 and 0.04, where $D_1$ is a distance between an upper end of said discharge port and the optical fiber preform, and $D_2$ is a distance between a lower end of the discharge port and the optical fiber preform.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serves to explain the principles of the invention.

FIG. 2 shows an apparatus for manufacturing an optical fiber preform according to one embodiment of the present invention.

DETAILED DESCRIPTION OF THE PREFERRED EMBODIMENTS

Figure 1:
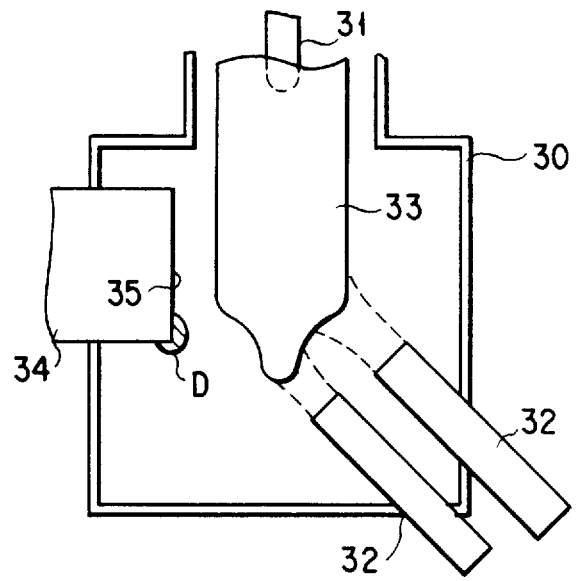
FIG. 1 exemplifies a conventional apparatus for manufacturing an optical fiber preform.

As shown in the FIG. 2, apparatus 10 comprises a reaction vessel 12, a combustion burner 14 for forming a core of an optical fiber, another combustion burner 16 for forming a cladding layer of an optical fiber, and a discharge pipe 18.

A pull-up port 12A for pulling up a porous optical fiber preform 1 is formed through the upper wall of the reaction vessel 12. The diameter of the pull-up port 12A should be as small as possible, as far as the porous optical fiber preform 1 can be pulled up therethrough.

The combustion burner 14 for forming a core hermetically extends through the wall of the reaction vessel 12 such that a flame spurting port 14A of the burner 14 is positioned within the reaction vessel 12. As seen from the drawing, the burner 14 is arranged to permit the flame spurting port 14A to face obliquely upward.

On the other hand, the combustion burner 16 for forming a cladding layer also extends hermetically through the wall of the reaction vessel 12 such that a flame spurting port 16A of the burner 16 is positioned within the reaction vessel 16. The burner 16 is arranged parallel with the burner 14 such that the flame spurting port 16A is also allowed to face obliquely upward. Further, the burner 16 for forming a cladding layer is located a predetermined distance above the burner 14 for forming a core.

The discharge pipe 18 is arranged to permit its discharge port 18A to be positioned within the reaction vessel 12. As shown in FIG. 2, the discharge port 18A is allowed to face obliquely downward.

An angle α formed between an imaginary plane including the discharge port 18A and another imaginary plane including the flame spurting port 14A of the burner 14 for forming a core is set to fall within a range of between 0° and 40° in view of the waste gas distribution within the reaction vessel, etc. Incidentally, an angle α of 0° would denote that the imaginary plane including the discharge port 18A of the discharge pipe 18 is parallel with the imaginary plane including the flame spurting port 14A of the core combustion burner 14. (An angle of 0° with respect to other angles defined hereinbelow should be interpreted similarly.) Alternatively, it is possible to define the angle α between the imaginary plane including the discharge port 18A and an imaginary plane including the flame spurting port 16A of the burner 16. In other words, it suffices for the flame spurting ports 14A, 16A of the burners 14, 16 to be arranged as described above. In other words, the shapes of the combustion burners are not particularly limited. For example, it is possible for the combustion burners 14, 16 to be bent, as far as the flame spurting ports 14A, 16A are positioned as shown in FIG. 2.

Attention should also be paid to distance $D_1$ between the upper end of the discharge port 18A and the outer surface of the final product of the porous optical fiber preform 1 and to distance $D_2$ between the lower end of the discharge port 18A and the outer surface of the final product of the porous optical fiber preform 1. It is desirable for a ratio $D_1/D_2$ to fall within a range of between 0.3 and 0.04 in order to prevent damage from being done to the fine glass particles forming the deposited preform. In order to meet this condition, an angle β formed between the imaginary plane including the discharge port 18A and a vertical plane should be 25° ±20°.

If the angle β is excessively small, it is impossible to suppress turbulence of the gas stream within the reaction vessel 12, with the result that fine glass particles are deposited on a lower portion of the discharge port 18A positioned within the reaction vessel 12. What should be noted is that the fine glass particles thus deposited may possibly be brought into contact with the porous optical fiber preform 1 deposited on a core 20 (a starting member). On the other hand, where the angle β is excessively large, it may be difficult to discharge efficiently the waste gas and the fine glass particles, which were not deposited on the core, to the outside of the reaction vessel 12. Such being the situation, the angle β should desirably be 25° ±20°. Incidentally, the angle β thus defined denotes that the imaginary plane including the discharge port 18A of the discharge pipe 18 intersects the tip of the core 20.

The apparatus of the construction described above produces advantageous effects. Specifically, when fine glass particles are deposited on the core 20, the gas stream flowing upward from the lower region of the reaction vessel 12 do not collide against the lower region of the discharge port 18A. As a result, the fine glass particles which have not been deposited on the core and the waste gas are discharged to the outside of the reaction vessel 12, making it possible to prevent the gas stream from being disturbed. It should also be noted that, since the discharge port 18A is formed to allow the lower portion thereof to be positioned away from the combustion burners, or away from the flames spurted from the combustion burners, the fine glass particles within the flames are unlikely to be deposited on the lower portion of the discharge port 18A. It follows that the porous preform 1 is prevented from being damaged by the fine glass particles deposited on the lower portion of the discharge port 18A.

The apparatus 10, which is constructed as described above, is used for manufacturing the porous optical fiber preform 1, which is then, converted into an optical fiber preform as follows. In the first step, the tip of the core 20 is mounted to a predetermined position of a rotating means (not shown). Then, while rotating the core 20, a gaseous glass raw material and a dopant raw material are introduced into the core combustion burner 14 together with a combustion gas. A mixture of these raw materials is spurted from the flame spurting port 14A so as to be combusted by the combustion gas. What should be noted is that a flame hydrolyzing reaction is carried out within the resultant flame between the glass raw material and the dopant raw material so as to form fine glass particles. The fine glass particles thus formed are deposited on the tip and outer circumferential surface of the core 20 so as to form a porous optical fiber preform for the core.

In the next step, a glass raw material and a dopant raw material, which are to be converted into a cladding layer, are introduced into the cladding combustion burner 16, which is arranged above the core combustion burner 14, together with a combustion gas. Then, a mixture of the glass raw material and dopant raw material is spurted from the flame spurting port 16A so as to be combusted by the combustion gas. As a result, a flame hydrolyzing reaction is carried out within the resultant flame between the glass raw material and the dopant raw material so as to form fine glass particles.

The resultant fine glass particles for the cladding are deposited on the outer circumferential surface of the porous optical fiber preform for the core formed in the preceding step, thereby manufacturing the porous optical fiber preform 1 comprising the core and the cladding layer.

It should be noted that the fine glass particles which have not been deposited on the core 20 or on the outer circumferential surface of the porous optical fiber preform 1 are sucked into the discharge pipe 18 through the discharge port 18A together with the waste gas resulting from the flame hydrolysis so as to be discharged into a waste gas processing apparatus (not shown) arranged outside the reaction vessel 12.

In the embodiment shown in FIG. 2, the discharge pipe 18 is arranged such that the axis of the pipe 18 extends in a horizontal direction. Also, the end portion of the pipe 18 positioned within the reaction vessel 12 is cut aslant to form the discharge port 18A such that the imaginary plane including the discharge port 18A is inclined by 25° from a vertical plane. In other words, the distance D2 between the outer circumferential surface of the porous optical fiber preform 1 and the lower end of the discharge port 18A is made greater than the distance D1 between the outer circumferential surface of the porous optical fiber preform 1 and the upper end of the discharge port 18A. Alternatively, the discharge pipe 18 the end portion of which is not cut aslant may be arranged to be inclined by about 25° C. from a horizontal plane. In this case, the imaginary plane including the discharge port 18A is inclined by about 25° C. from a vertical plane. It follows that the undesired waste gas and fine glass particles which have not been deposited as desired are discharged to the outside of the reaction vessel 12 as in the embodiment shown in FIG. 2.

A porous optical fiber preform was actually manufactured by using the apparatus shown in FIG. 2, with the result that the occurrence of defective preforms caused by deposition of fine glass particles on the lower portion of the discharge port 18A was decreased by about 97%, compared with the case of using the conventional apparatus shown in FIG. 1.

As described above, the apparatus of the present invention for manufacturing an optical fiber preform comprises a discharge pipe arranged such that the discharge port of the pipe is positioned on a side opposite to a side on which combustion burners are arranged. In addition, an imaginary plane including the discharge port of the discharge pipe is inclined by 25±20° C. from a vertical plane such that the lower end portion of the discharge port is recessed, compared with the upper end portion. The particular construction is effective for preventing a gas stream flowing upward from a lower region of a reaction vessel from colliding against the lower portion of the discharge port, with the result that the gas stream is discharged smoothly to the outside of the reaction vessel. It follows that the gas stream within the reaction vessel is prevented from being disturbed. What should also be noted is that, since the lower portion of the discharge port is positioned sufficiently far away from the flame, the fine glass particles within the flame are unlikely to be deposited on the lower portion of the discharge port. As a result, the porous preform is prevented from being damaged by the fine glass particles deposited on the lower portion of the discharge port. And in addition, the undesired waste gas and the fine glass particles which have not been deposited to form the porous preform can be discharged efficiently to the outside of the reaction vessel 12 because the upper end portion of the discharge port 18A of the discharge pipe 18 is positioned as in the prior art.

What is claimed is:

1. An apparatus for manufacturing an optical fiber preform, comprising:

a reaction vessel housing a core having a vertically extending axis;

combustion burners each having an upwardly inclined flame spurting port positioned within said reaction vessel for projecting fine glass particles in a gaseous stream so as to deposit a portion of the fine glass particles on said core, said fine glass particles being generated by a flame hydrolysis reaction; and a discharge unit arranged on a side of said reaction vessel for discharging said gaseous stream and ones of the fine glass particles which were not deposited on said core out of said reaction vessel, said discharge unit including a discharge port defined by an open, substantially planar edge of said discharge unit, wherein said discharge port is inclined such that an upper portion of said discharge port is positioned closer to said core than a lower portion of said discharge port, wherein said discharge port is arranged on an opposite side of the vertically extending axis of said core as said flame spurting ports in a manner such that said discharge port opposes said flame spurting ports with the vertically extending axis of said core intervening therebetween, and wherein an angle formed between an imaginary plane including said flame spurting port of one of said combustion burners and another imaginary plane including the discharge port of said discharge unit falls within a range between 0° and 40°.

2. The apparatus according to claim 1, wherein said combustion burners include a combustion burner for forming a cladding layer.

3. The apparatus according to claim 1, wherein said another imaginary plane including the discharge port of said discharge unit is inclined by 25°±20° from a vertical plane of said core.

4. An apparatus for manufacturing an optical fiber preform, comprising:

a reaction vessel housing a core having a vertically extending axis;

combustion burners each having an upwardly inclined flame spurting port positioned within said reaction vessel for projecting fine glass particles in a gaseous stream so as to deposit a portion of the fine glass particles on said core, said fine class particles being generated by a flame hydrolysis reaction; and a discharge unit arranged on a side of said reaction vessel for discharging said gaseous stream and ones of the fine glass particles which were not deposited on said core out of said reaction vessel, said discharge unit including a discharge port defined by an open, substantially planar edge of said discharge unit, wherein said discharge port is inclined such that an upper portion of said discharge port is positioned closer to said core than a lower portion of said discharge port, wherein said discharge port is arranged on an opposite side of the vertically extending axis of said core as said flame spurting ports in a manner such that said discharge port opposes said flame spurting ports with the vertically extending axis of said core intervening therebetween, wherein a ratio $D_1/D_2$ falls within a range of between 0.3 and 0.04, where $D_1$ is a distance between an upper end of said discharge port and the optical fiber preform being manufactured, and $D_2$ is a distance between a lower end of said discharge port and an imaginary line extending along a side surface of the optical fiber preform being manufactured, and wherein an imaginary plane including the discharge port of said discharge unit is inclined by 25°±20° from a vertical plane of said core.

5. The apparatus according to claim 4, wherein said combustion burners include a combustion burner for forming a cladding layer.

6. An apparatus for manufacturing an optical fiber preform, comprising:

a reaction vessel housing a core having a vertically extending axis;

combustion burners each having an upwardly inclined flame spurting port positioned within said reaction vessel for projecting fine glass particles in a gaseous stream so as to deposit a portion of the fine glass particles on said core, said fine glass particles being generated by a flame hydrolysis reaction; and a discharge unit arranged on a side of said reaction vessel for discharging said gaseous stream and ones of the fine glass particles which were not deposited on said core out of said reaction vessel, said discharge unit including a discharge port defined by an open, substantially planar edge of said discharge unit, wherein said discharge port is inclined such that an upper portion of said discharge port is positioned closer to said core than a lower portion of said discharge port, wherein said discharge port is arranged on an opposite side of the vertically extending axis of said core as said flame spurting ports in a manner such that said discharge port opposes said flame spurting ports with the vertically extending axis of said core intervening therebetween, wherein an imaginary plane including the discharge port of said discharge unit is inclined by 25°±20° from a vertical plane of said core, and a distance between an uppermost end of said discharge port and the optical fiber preform being manufactured is shorter than a distance between a lower end of said discharge port and an imaginary line extending along a side surface of the optical fiber preform being manufactured.

7. The apparatus according to claim 6, wherein said combustion burners include a combustion burner for forming a cladding layer.

* * * * *

UNITED STATES PATENT AND TRADEMARK OFFICE
CERTIFICATE OF CORRECTION

PATENT NO. : 5,879,428
DATED : March 9, 1999
INVENTOR(S) : Akihiro KANAO

It is certified that error appears in the above-identified patent and that said Letters Patent is hereby corrected as shown below:

Title page,

Item [57] ABSTRACT, line 1, after "preform" delete ",";

line 7, after "reaction" delete ";", and after "discharging" delete "the";

line 8, after "and" delete "the".

Signed and Sealed this

Twenty-eighth Day of November, 2000

Attest:

Q. TODD DICKINSON

Attesting Officer     Director of Patents and Trademarks